United States Patent [19]

Hiiro

[11] Patent Number: 4,971,412
[45] Date of Patent: Nov. 20, 1990

[54] LASER OPTICAL SYSTEM HAVING A PHASE CORRECTION FOR CONTROLLING INTENSITY DISTRIBUTION

[75] Inventor: Hiroyuki Hiiro, Kanagawa, Japan

[73] Assignee: Fuji Photo Film Co., Ltd., Kanagawa, Japan

[21] Appl. No.: 358,236

[22] Filed: May 30, 1989

[30] Foreign Application Priority Data

May 31, 1988 [JP] Japan .................. 63-133412

[51] Int. Cl.$^5$ .................. G02B 26/10; G02B 27/00
[52] U.S. Cl. .................. 350/6.8; 350/163
[58] Field of Search .................. 350/6.1, 6.2, 6.3, 6.4, 350/6.5, 6.6, 6.7, 6.8, 6.9, 6.91, 163

[56] References Cited

U.S. PATENT DOCUMENTS 4,699,465 10/1987 Rice et al. .................. 350/162.11
4,764,929 8/1988 Thaniyavarn .................. 372/20

FOREIGN PATENT DOCUMENTS 62-98320 5/1987 Japan .

OTHER PUBLICATIONS

*Optical Engineering*, May/June 1980, vol. 19, No. 3, pp. 297-305, by J. R. Fienup, Iterative Method Applied to Image Reconstruction and To Computer-Generated Holographs.

Appl. Phys. Lett 41(12), 15 Dec. 1982, pp. 27-29, "Focusing of a 7700-A High Power Phased Array Semiconductor Laser", D. R. Scifres et al. IEEE Journal of Quantum Electronics, vol. QE-22, No. 6, Jun. 1986, Use of a Phase Corrector Plate to Generate a Single-Lobed Phased Array for Field Pattern, J. R. Heidel et al.

Appl. Phys. Lett. 50(13), 30 Mar. 1987, pp. 783-795, "Stable Quasi0° Phase Mode Operation in a Laser Array Diode Nearly Aligned with a Phase Shifter", M. Taneya et al.

*Primary Examiner*—Bruce Y. Arnold
*Assistant Examiner*—Ronald M. Kachmarik
*Attorney, Agent, or Firm*—Sughrue, Mion, Zinn, Macpeak & Seas

[57] ABSTRACT

A laser optical system for obtaining a Gaussian distribution by correcting a phase laser beam oscillating in multi-transverse mode oscillated from a phase synchronous semiconductor laser or a broad contact semiconductor laser. The phase is corrected by multiple concavo-convexities of a phase correction plate arranged parallel to the direction of generating the transverse mode. The phase correction plate is positioned downstream from a collimator which turns the laser beam into parallel light, that is, the phase correction plate is disposed through the collimated beam, i.c., in an area where the beam is magnified and is of optically equal value regardless of position. Therefore, adjustment of the position of the phase correction plate is easy and formation of the concavo-convexity pattern of the phase correction plate is easy.

20 Claims, 4 Drawing Sheets

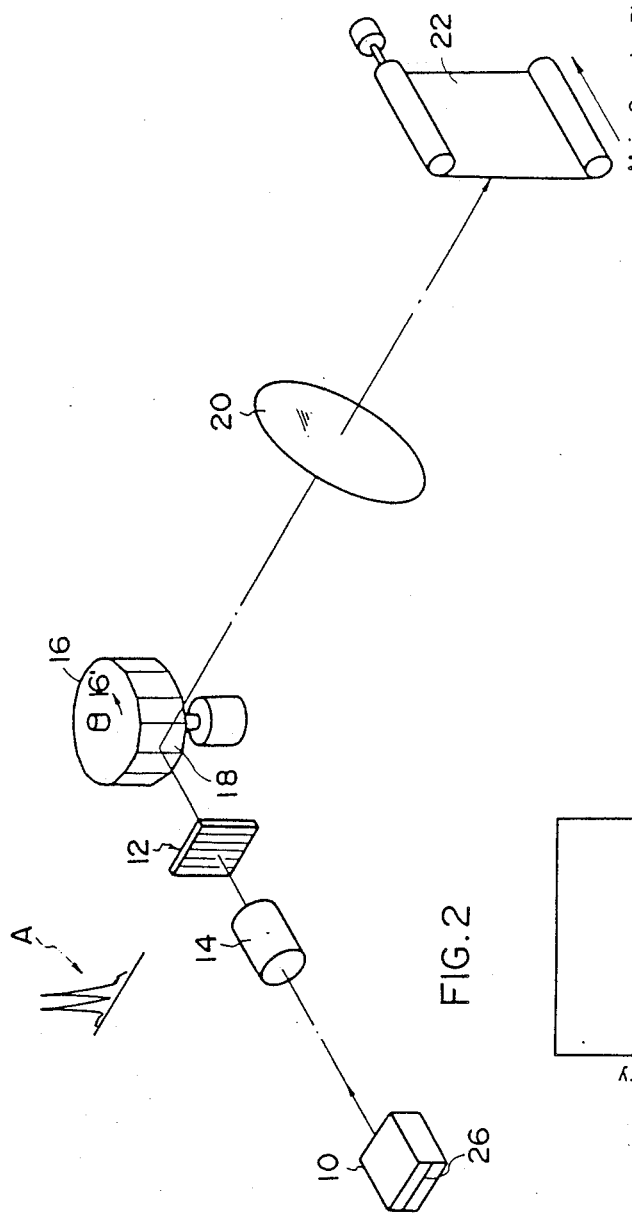

Oscillating Direction In Transverse Mode.

4,971,412

LASER OPTICAL SYSTEM HAVING A PHASE CORRECTION FOR CONTROLLING INTENSITY DISTRIBUTION

BACKGROUND OF THE INVENTION

1. Field of the Invention

The present invention is related to a laser optical system, particularly a laser optical system to preferably apply to a light recording apparatus for recording an information in form of letters or the like on certain recording medium by using a laser that oscillates in a multi-transverse mode of a phase synchronous semiconductor laser or a broad contact semiconductor laser.

2. Description of the Related Art

As seen in FIG. 3, a phase synchronous semiconductor laser in constructed as a multi-stripe type of laser diode array which is formed by dividing activation laser formed along a pn conjunction plane 26, and forming a multi-heterogeneous construction of a striped laser oscillation area 28 parallel arranged with several to several tens in one row. In the above stated construction, each laser oscillation area functions in a basic transverse mode and is connected to the adjacent laser oscillation area in an energy level. For that reason, a phase of an emitted laser beam from each laser oscillation area becomes synchronous, and oscillates in the transverse mode, so that a high output is obtained. A semiconductor laser of this type already exists in SDL-2410, SDL-2420 (Spectra Diode Labs Co., trademark) series.

Furthermore, it is known that there is phase difference in the laser beam emitted from the laser oscillation area in such a semiconductor laser, and when the laser beams emitted from each the oscillation area has differences of 180°, as shown in FIG. 4, two parallel lobes are formed in a direction along the pn conjunction plane in the far field pattern. Consequently, though the laser beam which forms two lobes is applied for recording on the recording medium, since the laser beam does not focus in one spot of a recording medium, a high resolution optical system can not be realized. Especially, if the laser beam is used for recording lettered information by dots on a microfilm, where a resolution power of about 3360/7.2 mm is required, the above stated two lobes cause problems since it is necessary to record each dot of the information. Further, the broad contact semiconductor laser, solid laser, and a gas laser have the same problems as the phase synchronous semiconductor lasers because of oscillating in the multi-transverse mode.

For this reason, the conventional phase synchronous semiconductor lasers are provided with a concavo-convexity phase correction plate which is arranged adjacent to nonreflective coating surface for producting an optical path difference (Appl. Phys. Lett., Vol. 50, No. 13, 30 Mar. 1987, page 783 FIG. 1), or a microscope objective is disposed at an emission side of the phase synchronous semiconductor laser, a phase correction plate similar to the above stated phase correction plate is disposed in a position of image formation formed by the objective on the coating surface of the semiconductor laser (IEEE JOURNAL OF QUANTUM ELECTRONICS. VOL. QE-22 No. 6, JUNE 1986, page 750, FIG. 3), so that a phase correction is achieved to obtain a Gaussian distribution.

Further, there are techniques related to the present invention, specifically applying techniques for cutting one of the two lobes by the optical system, which have been published in Appl. Phys. Lett. 41 (12), 15 Dec. 1982, page 28, FIG. 3 and in Japanese Patent Application Laid Open No. 62-98320.

However, in a case where a phase correction plate is arranged adjacent to the coating surface of the semiconductor laser, the concavo-convexities of the phase correction plate have to correspond to the stripe width which is several $\mu m$ degrees of the phase synchronous semiconductor laser, and manufacturing of the phase correction plate of the required preciseness is difficult. In the case of using an objective, a magnified image of the nonreflective coating surface is formed by the objective and the manufacture becomes simple in comparison with the above case. However, because it is necessary to arrange the phase correction plate at the point of image formation by the objective, adjustment tends to be troublesome. If an attempt is made at simplifying the manufacture further by magnifying the magnified image of the coating surface, the optical system becomes large size, and it becomes necessary to use a large size lens in the objective because the magnification ratio is determined by the ratio of the focal length of the lens used as the objective. Other types of lasers, like the broad contact lasers, have the same problems.

SUMMARY OF THE INVENTION

An object of the present invention is to provide a laser optical system which is manufactured easily and in a small size and additionally is easy to adjust and gives clear spot images to solve the above stated problems in the conventional optical system.

To this end, the laser optical system of the present invention is comprised by a laser for oscillating in a multi-transverse mode, a collimator for collimating the beam oscillated from the laser, a focusing optical system for focusing the beam, and a phase correction element which has multiple concavo-convexities arranged parallel in a direction of generating the transverse mode, and is disposed between the collimator and the focusing optical system for correcting the phase of the beam passed through the collimator in order to obtain a single lobe of a light intensity distribution in the focus of the focusing optical system by the concavo-convexities.

Next, the function of the present invention is explained. The laser of the present invention oscillates in a multi-transverse mode. In this type of laser, there is a phase synchronous semiconductor laser which has multiple stripes provided with narrow width laser oscillation areas arranged in multiple rows in parallel in a predetermined direction, or a broad contact laser with a stripe width of which is greater than a predetermined value. The beam emitted from the laser is turned into a parallel light beam by the collimator and entered into a phase correction element. In order to obtain a single lobe of light intensity distribution in the focus of the focusing optical system, phase correction of the incident beam is carried out by the phase correction element, which is positioned between the collimator and the focusing optical system and has the multiple concavo-convexities arranged in a parallel direction for generating the transverse mode. This means that the single lobe light intensity has a distribution which has the single peak above the threshold, but there may be several peaks below the threshold. As an example of the single lobe light intensity distribution, there is a Gaussian distribution which has only one peak above the threshold. The concave-convexities pattern of the phase correction element is sought on the basis of a converged function obtained by the following steps:

(a) supposing a function that represents distribution of complex amplitudes of an incident laser beam incidenced into said concavo-convexity pattern;

(b) performing a fourier transformation on the product of said two functions;

(c) seeking a function replaced intensity distribution by a single lobe light intensity distribution without changing the phase component of the function subjected to the Fourier transformation;

(d) seeking a function of the reverse Fourier transformation of the step (c) function; and thereafter, a function corresponding to the concavo-convexity pattern is changed in the form of the product of said two functions from the function obtained in step (d), the function which represents said item (a) concavo-convexity pattern is obtained by infinitesimal change of said function corresponding to the concavo-convexity, and said steps (a)-(d) are repeated. In this way, in the present invention, the laser is disposed, at a first focus of the optical system which is comprised of the collimator and the focusing optical system, and the phase correction element is disposed between the collimator and the focusing optical system, by which the phase is corrected and the intensity distribution becomes a single lobe light intensity distribution after Fourier transformation thereby, a spot is obtained, which the intensity distribution of which becomes a single lobe light intensity distribution in the second focus of the optical system. Because it is thought that the beams which have been collimated by the collimator are optically equal even though the distance from the collimator is change, so that positioning of the phase correction element is not limited, adjustment of positioning the phase correction element becomes easy. Furthermore, because a collimator is used, the image of the point of emission of the laser beam can be magnified greater than the size obtainable when an objective is used and the formation of the concavo-convex pattern can be simplified. In addition, because collimating of the beams can be achieved, even without extending the focal distance of the collimator, the size of the system can become smaller.

According to the above description, the present invention can provide a laser optical system, since a collimator is used and a phase correction element is arranged on the side of the emitting beam of the collimator, which enables a small size of the laser optical system and easy manufacturing thereof. At the same time, an adjustment is easy and the laser optical system can easily obtain a spot with a single lobe light intensity distribution from the beam of the transverse mode.

BRIEF DESCRIPTION OF THE DRAWINGS

FIG. 1 is a schematic view of a first embodiment of the present invention for a laser beam recording apparatus.

FIG. 2 is a characteristic view of a curve of a far field pattern of the first embodiment.

DETAILED DESCRIPTION OF THE INVENTION

Figure 3:
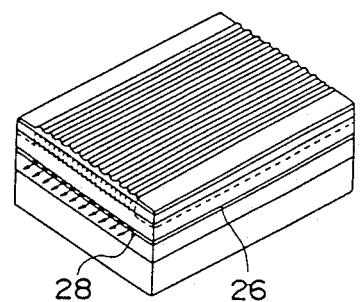
FIG. 3 is a schematic view of a phase synchronous semiconductor laser.
Figure 4:
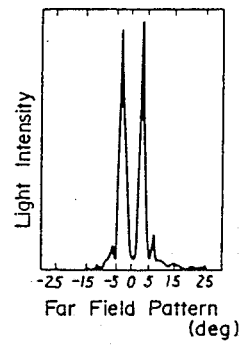
FIG. 4 is a characteristic view of a far field pattern of a phase synchronous semiconductor laser.

Referring to the drawings, embodiments of the present invention applied in a scanning optical system to obtain a Gaussian distribution of a single lobe light intensity distribution are explained in detail. FIG. 1 is a schematic view of a first embodiment of the present invention to show a laser beam scanning optical system which comprises a laser optical system.

Figure 5:
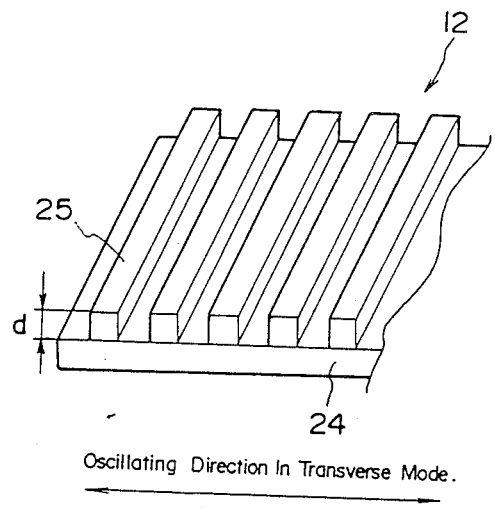
FIG. 5 is a cross-sectional view of a phase correction plate.

A phase synchronous semiconductor laser 10 is disposed to correspond to a pn junction surface or plane 26 of the phase synchronous semiconductor laser 10 with a main scanning direction, that is, the pn junction plane and the main scanning direction exist in the same plane. A far field pattern A is adapted to form two lobes along the main scanning direction as shown in FIG. 1. On a side of emitting the laser beam of the phase synchronous semiconductor laser 10, a collimator lens 14 is arranged to produce a bundle of parallel light rays from the laser beam emitted from the phase synchronous semiconductor laser 10. A phase correction plate 12 is arranged on a side of emitting the laser beam from the collimator lens 14. The phase correction plate 12 is, as shown in FIG. 5, formed of a plane-parallel glass plate 24 ($SiO_2$), upon which multiple convex ridges 25 are formed for instance, by way of a vapor deposition of a transparent thin film ($Si_3N_4$) with a refractive index n to form a concavo-convex pattern. This phase correction plate 12 causes an optical path difference $(n-1)d$ between both laser beams when the laser beam passes through the convex and concave parts successively, where the thickness of the convex ridges shall be equal to d, and causes a phase difference of $(2\pi/\lambda)(n-1)d$, (when $\lambda$ is a wavelength of the laser beam), thereby correcting the phase of the laser beam passed through the phase correction plate. The phase correction plate 12 is arranged on a side of emitting the laser beam and extends in the orthogonal direction of the convex ridges with the pn conjunction plane (the orthogonal direction with a direction of generating the transverse mode).

Looking at FIG. 1, one sees that a rotatable polygon mirror 16 which has multiple reflecting surfaces 18 is arranged on a side of emitting the laser beam of the phase correction plate 12 to sweep the laser beam passed through the phase correction plate 12 in the main scanning direction. On the reflection side of the polygon mirror 16 is a scanning lens 20, which is comprised by a lens of the focal distance $f\theta$ to focus the laser beam on a recording material 22, the recording material being disposed on a focus plane of the scanning lens 20.

Next, the procedure for determining the formation of the concavo-convex pattern of a phase correction plate 12 is explained.

(1) Firstly, functions are assumed, one function $h_x(X)\lambda$ represents a complex amplitude distribution of the laser beams that have been collimated by the collimator lens 14, and the other function $gk(x)$ represents the form of the concavo-convex pattern in the laser beam emitted from the phase synchronous semiconductor laser 10 and paralleled by the collimator lens, which is focused, having a Gaussian distribution in the focus of the scanning lens 20 after passing through the phase correction plate 12. In the function, $k=1,2,\ldots$, X is the length of the direction along the pn junction plane 26 from an edge of the phase correction plate 12 as a starting point.

(2) Next, the function $F_k(U)$ can be calculated by subjecting the product of the above two functions $h_k(X) \cdot g_k(X) = f_k(X)$ to the Fourier transformation. This function $F_k(U)$ is expressed as follows.

$$F_k(U) = |F_k(U)| \exp[i\phi_k(U)] \quad (1).$$

(3) Without changing the phase of the above formula (1), function $F_k'(U)$ is sought by replacing intensity distribution with Gaussian distribution $|P(U)|$, and function $F_k'(U)$ is found as follows:

$$F_k'(U) = |P(U)| \exp[i\phi_k(U)] \quad (2)$$

(4) Next, reverse Fourier transformation of function $F_k'(U)$ is carried out, expressed in the same form as function $f_k(X)$ and results in $h_k(X) \cdot g_k'(X)$. Here $g_k'(X)$ is the function expressing the form of the concave-convex pattern.

(5) Next, function $g_k'(X)$ is differentiated by a microvalue of $\Delta g(X)$ and assumed to give a new function $g_{k+1}(X)$ according to the above (1).

Steps (1) to (5) of the above procedure are repeated until the functions converge and intensity distribution becomes a Gaussian distribution after Fourier transformation and a function determining the concavo-convex pattern can be obtained. According to this function, formation of the convex ridges, as for example by vapor deposition on the phase correction plate, can be obtained. This technique is published in OPTICAL ENGINEERING MAY/JUNE 1980, Vol. 19, No. 3, page 297 to 304.

An operation of the first embodiment is explained with reference to FIGS. 1 and 2 as follows.

A multi-transverse laser beam oscillated from the phase synchronous semiconductor laser 10, is entered into a phase correction plate 12 after being turned into parallel light rays by the collimator lens 14. The laser beam emerged from the phase correction plate 12 is made to sweep in the main sweeping direction by a polygon mirror 16 and focused by the scanner lens 20 onto the recording material 22.

At this stage, as explained above, as the phase correction plate corrects the phase, the intensity distribution in the focused spot focused on the recording material becomes a Gaussian distribution. And an information is recorded on the recording material 22 by the main scanning by the polygon mirror 16 and by the secondary scanning due to movement of the recording material 22.

Figure 6:
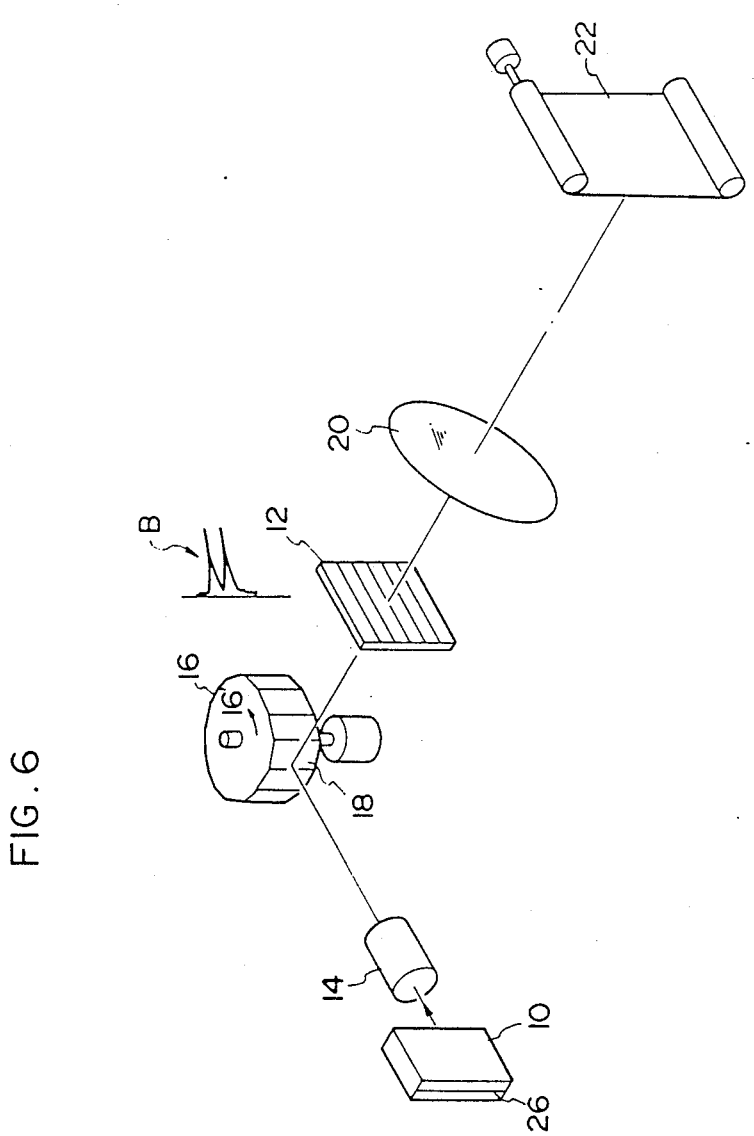
FIG. 6 is schematic view of a second embodiment of the present invention of a laser beam recording apparatus.

Next, referring to FIG. 6 the second embodiment of the present invention is explained. Where parts are similar to those of the first embodiment, they are labeled with the same symbols and an explanation is omitted.

In the first embodiment, the phase synchronous semiconductor laser 10 is disposed to make the pn junction plane 26 correspond to the main scanning direction of the laser beam. In the second embodiment, as shown in FIG. 6, the phase synchronous semiconductor laser 10 is arranged orthogonal to the direction of arrangement in the first embodiment. For this reason, the far field pattern B shown in FIG. 6 gives two lobes along the secondary scanning direction. The phase correction plate 12 is arranged between the polygon mirror 16 and the scanning lens 20 is such a way that the direction of the convex ridges 25 and the main scanning direction correspond each other.

The function of the second embodiment is explained. The laser beam reflected from the polygon mirror 16 is swept in the main scanning direction. At this stage, as the arrangement of the transverse mode laser beam passing through the phase correction plate 12 and the convex ridges of the phase correction plate 12 are not relatively shifted, phase correction of the laser beam is always carried out as in the first embodiment even though the laser beam is swept on the phase correction plate 12.

Further, in the above embodiments, the polygon mirror 16 is used to provide scanning, but it is possible to scan the laser beam by a mirror which is driven by a galvanometer or a resonant scanner. The above embodiments are explained as to obtaining a Gaussian distribution, but for subthreshold level, not contributing to recording on the recording material, multiple peaks may be allowed.

What is claimed is:

1. A laser optical system comprising:
   a laser for oscillating in multi-transverse mode,
   a collimator for collimating a beam oscillated from said laser;
   a focusing optical system for focusing the beam; and
   a phase correction element having multiple concavo-convexities arranged parallel in the direction of generating a transverse mode, and disposed between said collimator and said focusing optical system, for correcting a phase of the beam passed through said collimator by said concavo-convexities to obtain a single lobe light intensity distribution in the focus of said focusing optical system.

2. A laser optical system according to claim 1, wherein said laser is a phase synchronous semiconductor laser which comprises multiple stripes provided narrow laser oscillating areas arranged parallel in multiple rows in a predetermined direction.

3. A laser optical system according to claim 1, wherein said laser is a broad contact semiconductor laser, a stripe width of which is greater than a predetermined value.

4. A laser optical system according to claim 1, wherein said concavo-convexity pattern of said phase correction element is determined on the basis of a converged function obtained by the following steps;
   (a) supposing a function that represents a distribution of complex amplitudes of an incident laser beam being incident to said phase correction element, and another function representing said concavo-convexity pattern;
   (b) performing Fourier transformation on the product of said two functions;
   (c) seeking a function replaced intensity distribution by a single lobe light intensity distribution without changing the phase component of the function subjected to the Fourier transformation;
   (d) seeking a function of the reverse Fourier transformation of the step (c) function; and
   thereafter, a function corresponding to the concavo-convexity pattern is changed into the form of the product of said two functions from the function obtained in step (d), and
   the function which represents said item (a) concavo-convexity pattern is obtained by infinitesimal change of said function corresponding to the concavo-convexity, and
   said steps (a)-(d) are repeated.

5. A laser optical system according to claim 1, wherein said single lobe light intensity distribution has one peak above a threshold level.

6. A laser optical system according to claim 1, wherein said single lobe light intensity distribution is of a Gaussian distribution.

7. A laser optical system according to claim 1, further comprising:
means for sweeping the beam disposed between said collimator and said focusing optical system.

8. A laser optical system according to claim 7, wherein said phase correction element is arranged between said collimator and said sweeping means.

9. A laser optical system according to claim 7, wherein said phase correction element is arranged between said sweeping means and said focusing optical system.

10. A laser optical system, comprising:
a laser for oscillating in multi-transverse mode with a pn junction plane arranged parallel to main scanning direction;
a collimator for collimating a beam oscillated from said laser;
means for sweeping the beam collimated by said collimator in the main scanning direction;
a focusing optical system for focusing the beam from said sweeping means;
a phase correction element having multiple concavo-convexities arranged parallel in the direction of generating a transverse mode, and disposed between said collimator and said sweeping means, for correcting a phase of the beam passed through said collimator by said concavo-convexities to obtain a single lobe light intensity distribution in the focus of said focusing optical system.

11. A laser optical system according to claim 10, wherein said laser is a phase synchronous semiconductor laser which comprises multiple stripes providing narrow laser oscillating areas arranged in parallel in multiple rows in a predetermined direction.

12. A laser optical system according to claim 10, wherein said laser is a broad contact semiconductor laser, a stripe width of which is greater than a predetermined value.

13. A laser optical system according to claim 10, wherein said concavo-convexity pattern of said phase correction element is determined on the basis of a converged function obtained by the following steps;
(a) supposing a function that represents distribution of complex amplitudes of an incident laser beam being incident to said phase correction element, and another function representing said concavo-convexity pattern;
(b) performing a Fourier transformation on the product of said two functions;
(c) seeking a function replaced intensity distribution by a single lobe light intensity distribution without changing the phase component of the function subjected to the Fourier transformation;
(d) seeking a function of the reverse Fourier transformation of the step (c) function; and
thereafter, a function corresponding to the concavo-convexity pattern is changed into the form of the product of said two functions from the function obtained in step (d), and
the function which represents said item (a) concavo-convexity pattern is obtained by infinitesimal change of said function corresponding to the concavo-convexity, and
said steps (a)-(d) are repeated.

14. A laser optical system according to claim 10, wherein said single lobe light intensity distribution has one peak above a threshold level.

15. A laser optical system according to claim 10, wherein said single lobe light intensity distribution is of a Gaussian distribution.

16. A laser optical system, comprising:
a laser for oscillating in multi-transverse mode with a pn junction plane arranged orthogonal to main scanning direction;
a collimator for collimating a beam oscillated from said laser;
means for sweeping the beam collimated by said collimator in the main scanning direction;
a focusing optical system for focusing the beam from said sweeping means;
a phase correction element having multiple concavo-convexities arranged in parallel in the direction of generating a transverse mode, and disposed between said sweeping means and said focusing optical system, for correcting a phase of the beam passed from said sweeping means by said concavo-convexities to obtain a single lobe light intensity distribution at the focus of said focusing optical system.

17. A laser optical system according to claim 16, wherein said laser is a phase synchronous semiconductor laser which comprises multiple stripes provided narrow laser oscillating areas arranged parallel in multiple rows in a predetermined direction.

18. A laser optical system according to claim 16, wherein said laser is a broad contact semiconductor laser, a stripe width of which is greater than a predetermined value.

19. A laser optical system according to claim 16, wherein said concavo-convexity pattern of said phase correction element is determined on the basis of a converged function obtained by the following steps;
(a) supposing a function that represents distribution of complex amplitudes of an incident laser beam being incident to said phase correction element, and another function representing said concavo-convexity pattern;
(b) performing a Fourier transformation on the product of said two functions;
(c) seeking a function replaced intensity distribution by a single lobe light intensity distribution without changing the phase component of the function subjected to the Fourier transformation;
(d) seeking a function of the reverse Fourier transformation of the step (c) function; and
thereafter, a function corresponding to the concavo-convexity pattern is changed into the form of the product of said two functions from the function obtained in step (d), and
the function which represents said item (a) concavo-convexity pattern is obtained by infinitesimal change of said function corresponding to the concavo-convexity, and
said steps (a)-(d) are repeated.

20. A laser optical system according to claim 16, wherein said single lobe light intensity distribution has one peak above a threshold level.

* * * * *